July 7, 1942.    H. A. ADAMS    2,288,871
TRANSLUCENTSCOPE
Filed March 8, 1939    2 Sheets-Sheet 1

HAROLD A. ADAMS,
INVENTOR.

BY
ATTORNEY.

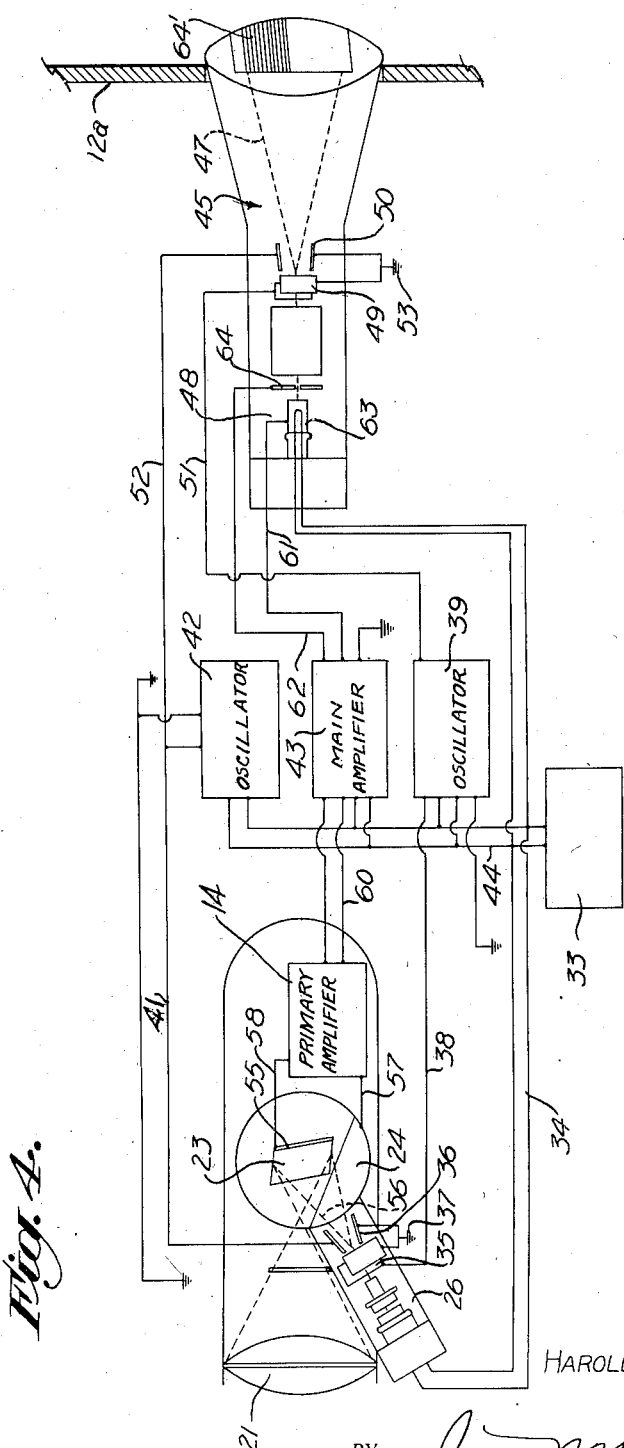

Patented July 7, 1942

2,288,871

UNITED STATES PATENT OFFICE 2,288,871

TRANSLUCENTSCOPE

Harold A. Adams, Bakersfield, Calif.

Application March 8, 1939, Serial No. 260,549

1 Claim. (Cl. 178—6.8)

My invention relates to a method and apparatus for obtaining visible images of objects which are obscured insofar as ordinary visibility is concerned, and relates in particular to a portable or mobile device of this character wherein the image is instantaneously produced and has such movement as the object may have.

There are a number of conditions under which my invention may be employed wherein objects are obscured from ordinary vision by reflection of light rays from the object or scene. For example, an object obscured from vision by an intervening wall of fog or other suspension of relatively fine particles in the air. Under submarine conditions, the water acts as an obscuring medium so that the range of visibility is very limited. It is contemplated that the utility of the invention embraces procurement of images through materials commonly classified translucent or opaque. A very valuable use of the invention is in conjunction with the operation of aircraft during hazardous weather, at which time the atmospheric conditions may be such as to obscure the ground, mountains, etc., from vision. Not only is the danger of crashing into mountain peaks or even low-lying terrain, but landing fields may be obscured from view. Accordingly, an object of the invention is to provide a device which will receive an image comprised of rays of a type which will pass through fog and other translucent materials, and which will instantaneously translate such images into visible images. Where the invention is employed with aircraft, it gives the pilot visibility of distant objects so that he may know the presence of mountains or other obstructions in the path of flight, so that in case of emergency he may select a comparatively smooth place on which to land if the same be within his range of visibility, and so that when the aircraft is being landed at a regular landing field during weather of negative visibility, he may have an image of the landing field. It is contemplated that ray projectors may be suitably spaced on the landing field to indicate the area in which the aircraft is to be landed. Such ray projectors, may for example, be of a type to emanate a frequency of ray which will penetrate fog or other obscuring medium in the air, such rays may be within the range of infra red for example.

The invention is believed to be especially valuable as an adjunct of defensive armament. For example, raids are made on cities mostly during conditions of fog or haze, and on nights when visibility is very poor. The presence of fog or large areas of clouds lowers the effectiveness of search lights, but the present device is adapted to obtain visible images of aircraft which are obscured due to such atmospheric conditions as hereinabove discussed. I contemplate that the device, for defensive purposes, may be used in pairs, both devices being focused upon an object and the distance of such object from the ground then being determinable by triangulation, which may be accomplished in much the same manner as in range finders of telescopic type. It is believed that a proper use of the invention will make any defended location, such as a city for example, comparatively safe against aerial attack, in view of the recent development of long range, rapid-fire rifles of anti-aircraft defense type.

In submarine operations, the invention will, through indirect means, give visibility of objects at some distance from the viewing device. It may be employed above or below the water as a means for determining the presence of icebergs, it may be employed by a submarine vessel in approaching a surface or undersea vessel for purpose of attack, where it is desired to avoid the use of the periscope which cuts the surface of the water so as to give visible indication of the presence of the submarine. By use of my present invention, the periscope may be submerged and the translucentscope mounted on the forward part of the submarine vessel may be employed to obtain an image of the submerged hull of the vessel being attacked so that aiming prior to the discharge of torpedoes may be readily accomplished. The invention is of utmost value to undersea craft in bringing into the vision of the pilots obstructions with which the craft is in danger of collision. On the other hand, the invention is adapted for use as a medium of defense against submarine attack in view of its ability to produce an image approaching a submarine or other vessel. Several of these devices may be submerged at or just outside the entrance of a harbor to obtain images of all undersea craft attempting to enter the harbor.

It is an object of the invention to provide a device of the character and for the general use set forth hereinabove, having means for receiving an image formed in or consisting of ray energy outside the limits of visible light, together with means for breaking down or disassembling the image into its constituent units and in accordance therewith modulating an electric current, which carries a delineation of the units of the image to a means for reassembling the image and causing the same to appear in visible light which device is small in size that part or all of the equipment may be portable or mobile.

It is a further object of the invention to provide means for obtaining a moving instantaneous image of an object or scene which is ordinarily obscured from view by reason of the interposition of a translucent medium of such character that rays within the visible range will not pass with sufficient magnitude to produce an image, this device having means for receiving formed in or consisting of rays which are in the non-visible range but are capable of passing through the translucent or obstructing medium, with means for translating the image directly into electrical energy values and subsequently translating the electrical values into an image formed in visible light.

It is a further object of the invention to provide a viewing device of portable or mobile character adapted to be held in retracted position in a vehicle or craft, such as an aircraft, and to be projected into viewing position as desired by the operator of the craft, this viewing device having associated therewith, means for transmission of the values of the image from the image receiving device to an image reproducing device suitably mounted within the craft, whereby an image received in non-visible light may be translated into and presented to the observer in the vehicle in visible light.

It is a further object of the invention to provide a device of the above character having an image receiver or image divider such as a mosaic or light sensitive medium adapted to receive an image through a suitable optical system, with a filter means for passing to the mosaic wave energy within the desired or selected range. This mosaic, in association with an electron gun which traverses the mosaic with an electron beam, serves to modulate a flow of electric energy, which modulated flow in turn controls the operation of a means for reproducing the image in light values so as to give the same visibility.

A further object of the invention is to provide a device of the character set forth in the foregoing wherein the electric energy flow, modulated in accordance with the values of the image, controls an electron beam which traverses a screen and controls the production of light on the screen in accordance with the values of the image so that such image will appear in visible light.

Further objects and advantages of the invention will be brought out in the following part of the specification.

Referring to the drawings which are for illustrative purposes only:

Fig. 4 is an electrical diagram showing in schematic form the combination of elements which may enter into and exemplify the principles of my invention.

Figure 1:
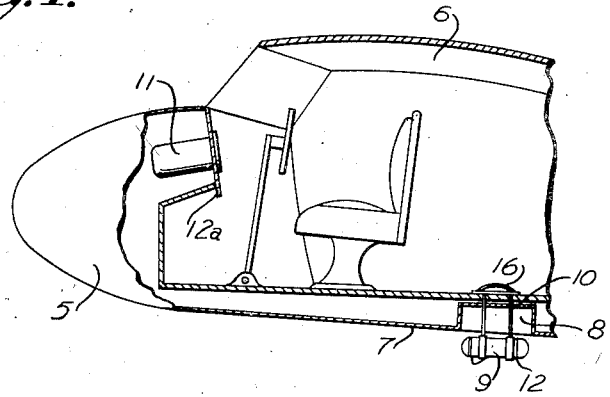
Fig. 1 is a fragmentary, diagrammatic view showing a portion of an airplane with a form of my invention mounted thereon.

In Fig. 1 of the drawings, I diagrammatically show the front end of a fuselage of an airplane 5, sectioned to show a cabin 6. In an external wall of the fuselage 5, preferably the lower wall 7 thereof, a compartment 8 is formed of a size to accommodate a viewing device 9, forming a part of my invention, which is supported by means, such as rods 10, whereby it may be moved from the compartment 8 into exposed or projected position as shown in Fig. 1. Associated with the viewing device 9, there is a receiver or image display device 11 supported in a convenient position visible to the pilot. Such image display device 11 may be mounted in the instrument panel 12a generally placed in front of the pilot occupying the pilot's chair. The viewing device 9 is of such character as to be portable so that with flexible cable connections it may be moved independently of the image display device 11, and although I contemplate that the viewing device 9 may, in certain installations, be mounted swivelly so that it may be pointed in any direction within a desired range of directions, for general aircraft work it is considered that the viewing device 9 need not be pivoted, but mounted so that it will point in the direction of flight of the airplane, when it is projected from the compartment 8 as shown in Fig. 1. In such position it will obtain an image of the area directly ahead of the airplane.

The viewing device 9 is ordinarily held in retracted position during normal conditions of flight, but at night or in a fog it may be projected and the equipment thereof may be operated in conjunction with the equipment of the image display device 11, to produce an image visible to the pilot, of a scene or object ahead of the aircraft.

The viewing device 9 includes a shell 12 which may be cylindrical and may have rounded cover 13 at the rear end thereof, to hold a primary amplifying unit such as the unit 14 diagrammatically shown in Fig. 4. The supporting rods 10 of the viewing device are secured to the shell 12 by use of clamping rings 14', and extend upward through guide sleeves 15 into the interior of the cabin 6. As shown in Fig. 1 the upper ends of the bars 10 may be connected by a cross bar 16 and used as a handle to raise and lower the viewing device 9, and means for releasably holding the viewing device 9 in desired position may be provided by spring-pressed balls 17 adapted to engage recesses 18 in the bars 10. A movable member 20 is slidably supported in the front end of the shell 12, and carries a suitable optical system which is simply represented as a lens 21 which may be adjusted longitudinally so as to focus, as indicated by lines 22, an image on the image receiving member or mosaic 23 of an electron image amplifier, pick up tube, or electronic image divider which is here represented as an iconoscope 24 mounted in the shell 12 by means of a bracket 25. The device 24 has an electron gun 26 which causes a beam or stream of electrons to traverse or scan the mosaic 23. A filter 27 is placed in the path of the image which is projected by the optical system, as indicated by the dotted lines 22, so that only the desired range of ray energy may pass.

A cable 28 is provided to carry the conductors necessary to connect the electrical equipment in the shell 12 with the remaining parts of the device shown in Fig. 4, and a flexible shaft or Bowden wire 29 extends to a means for adjusting the lens holder 20, such means being simply shown as a pin 30 engaging a slot 31 in the wall of the member 20, the member 29 being connected to the holder 20 at 32 so that movement of the shaft 29 will cause the rotation of the lens holder 20 in order that the travel of the slot 31 along the pin 30 will cause the lens holder 20 to move in axial direction, thereby focusing the optical system on the mosaic 23.

As shown in Fig. 4, the electron gun 26 is supplied with electric energy from a suitable power source shown as a battery 33, by means of conductors 34. The gun 26 is of cathode ray type and is provided with horizontal deflector plates or electrodes 35 and vertical deflector plates or electrodes 36, one each of which plates is connected to a ground 37. One of the horizontal deflector plates 35 is connected by means of a conductor 38 with an oscillator 39 of amplifying type and being preferably of the type known as a saw-tooth oscillator. One of the vertical deflector plates 36 is connected by means of a conductor 41 with a vertical deflection oscillator 42 which is of the same type as the oscillator 39. These oscillators 39 and 42, and also a main amplifier 43, are supplied with power source 33 by means of conductors 44.

Figure 2:
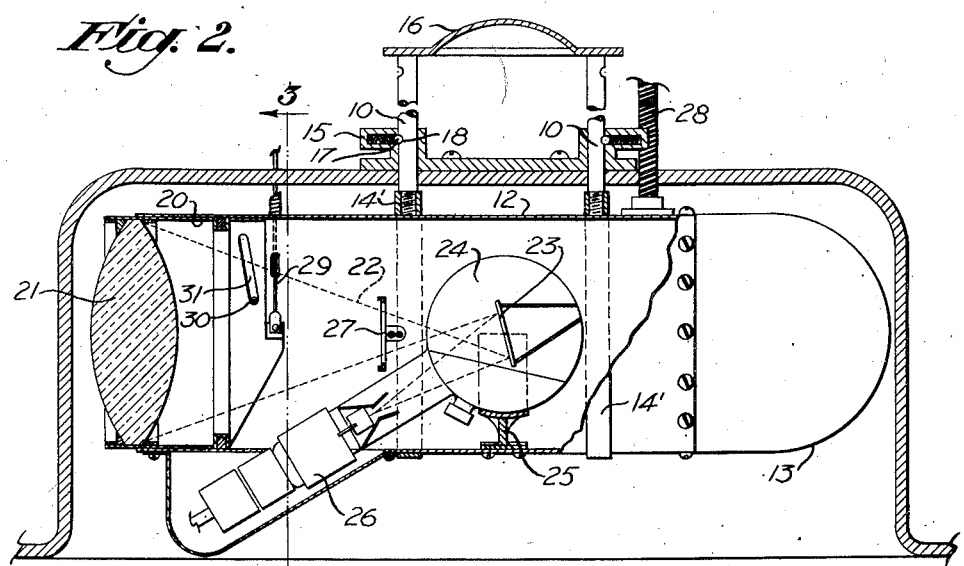
Fig. 2 is a partly sectioned view, drawn to enlarged scale, of the viewing device forming part of the invention.
Figure 3:
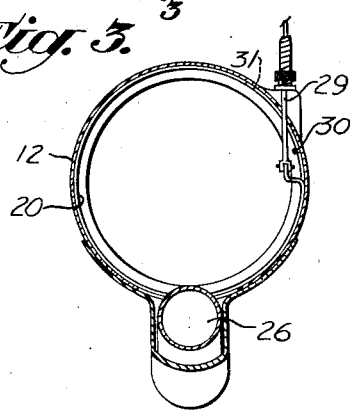
Fig. 3 is a cross-section on a plane represented by the line 3—3 of Fig. 2.

The first or primary amplifier 14 is placed preferably in the housing 13 at the rear end of the shell 12 of Fig. 2; whereas, the oscillators 39 and 42 and the main amplifier 43 may be mounted in the case of the image display or reproducing device 11 of Fig. 1, together with the image reproducing means 45, shown diagrammatically in Fig. 4. The reproducing means 45 may be cathode ray receiving tube such as a kinescope, and may have a screen 46 of suitable material to fluoresce when subjected to impingement of an electron beam or stream 47 from an electron gun 48 having horizontal deflector plates 49 and vertical deflector plates 50 to sweep or scan the screen 46. Conductors 51 and 52 connect one each of the deflector plates 49 and 50 with the oscillators 39 and 42. The remaining plates 49 and 50 are grounded at 53.

The operation of the preferred form of the invention is substantially as follows. The filtered image of the object, on which the optical system is focused, is received by the particles of electrosensitive material which coats the front face of the plate 55 of the mosaic 23. The electron stream 56 delivered from the electron gun 26 traverses the mosaic 23, and the strength or number of electrons passing from the mosaic 23 to the collector 58 of the iconoscope 24 varies with and is proportionate to the intensities of the rays forming the myriad of small areas constituting the image cast on the mosaic 23 by the optical means 21, at the times these minute areas or points of the image are struck by the electron stream 56 during the scanning of the image. Accordingly, there is a flow of electric current through, or an electric potential in, the video circuit formed in part by wires 57 and 58, which is modulated in accordance with the values of the image received by the mosaic 23. The comparatively weak signal thus produced, is received by the primary amplifier 14 and the modulations thereof are transmitted through conductors 60 to the main amplifier 43 and thence to the cathode gun 48 of the image reproducing means 45 by conductors 61 and 62 which connect respectively to the electrode 63 and the control valve or grid 64 of the cathode ray gun 48.

The modulated signal potential impressed on the grid 64 varies the strength of the electron stream delivered by the electron gun 48, in accordance with values of the image received by the viewing device 9, and the material, such as zinc sulfide or cadmium tungstate etc. which coats the screen 46 luminesces in accordance with the modulations of the electron stream, with the result that there appears on the screen 46 a visible image which is a counterpart of the image received in non-visible rays by the mosaic 23 of the viewing device 9.

I claim as my invention:

For use in an aircraft with electro-responsive means to receive an image composed of rays outside the range of visible light and to translate said image into modulated electrical energy, and means within the aircraft to convert said modulated electrical energy into a visible image, the combination of: a casing to contain said electro-responsive means, said casing having an annular aperture; a lens unit in said aperture; spiral cam and follower means cooperating between said lens unit and said shell within said shell, whereby rotation of said lens unit will result in axial focusing movement thereof; a bracket carried by the aircraft, said bracket having a pair of spaced substantially parallel openings; bars extending through said openings to rigidly hold said casing in extended or retracted position relative to said aircraft, said bars being slidable through said openings and having the outer ends thereof connected to said casing; lock means engaging said bars so as to hold them in positions wherein said casing is retracted and extended; a handle connected to the inner ends of said bars to operatively move the same; and a mechanical adjusting means for said lens unit comprising a tube extending from the aircraft and having the outer end thereof connected tangentially to said casing, and an actuating member extending through said tube and being axially movable therein, the outer end of said actuating member being connected to a peripheral portion of said lens unit to transmit rotative movement thereto.

HAROLD A. ADAMS.